United States Patent
Plump et al.

(10) Patent No.: US 6,691,949 B2
(45) Date of Patent: Feb. 17, 2004

(54) VERTICAL TAKEOFF AND LANDING AERIAL VEHICLE

(75) Inventors: John M. Plump, Arlington, MA (US); Neil R. Gupta, Costa Mesa, CA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 10/191,733

(22) Filed: Jul. 8, 2002

(65) Prior Publication Data

US 2003/0052222 A1 Mar. 20, 2003

Related U.S. Application Data (60) Provisional application No. 60/303,369, filed on Jul. 6, 2001.

(51) Int. Cl.[7] .......................... B64C 27/22; B64C 29/02; B64C 39/06
(52) U.S. Cl. ..................... 244/12.2; 244/34 A
(58) Field of Search ............... 244/7 B, 12.2, 244/12.3, 23 A, 23 C, 34 A (56) References Cited

U.S. PATENT DOCUMENTS

| | | | |
|---|---|---|---|
| 2,907,536 A | * 10/1959 | Von Zborowski | 244/12.1 |
| 3,456,902 A | 7/1969 | Visconti | |
| 4,037,807 A | * 7/1977 | Johnston et al. | 244/7 B |
| 4,196,877 A | 4/1980 | Mutrux | |
| 4,566,699 A | 1/1986 | Cucuzza | |
| 4,795,111 A | 1/1989 | Moller | |
| 5,150,857 A | * 9/1992 | Moffitt et al. | 244/12.2 |
| 5,152,478 A | 10/1992 | Cycon et al. | |
| 5,226,350 A | 7/1993 | Cycon et al. | |
| 5,277,380 A | 1/1994 | Cycon et al. | |
| 5,281,099 A | 1/1994 | Hunter et al. | |
| 5,295,643 A | * 3/1994 | Ebbert et al. | 244/7 B |
| 5,340,279 A | 8/1994 | Cycon et al. | |
| 5,419,513 A | 5/1995 | Flemming, Jr. et al. | |
| 5,575,438 A | 11/1996 | McGonigle et al. | |
| 5,758,844 A | 6/1998 | Cummings | |
| 5,890,441 A | 4/1999 | Swinson et al. | |
| RE36,487 E | * 1/2000 | Wainfan | 244/48 |
| 6,270,038 B1 | 8/2001 | Cycon et al. | |
| 6,450,445 B1 | 9/2002 | Moller | |

OTHER PUBLICATIONS

International Search Report.

* cited by examiner

*Primary Examiner*—Robert P. Swiatek
(74) *Attorney, Agent, or Firm*—McDermott, Will & Emery (57) ABSTRACT

An aerial vehicle including a toroidal fuselage having a longitudinal axis, and a duct extending along the longitudinal axis between a leading edge and a trailing edge of the fuselage, first and second counter-rotating, variable pitch rotor assemblies coaxially mounted within the duct of the fuselage, and at least one canard wing secured to the toroidal fuselage and having a leading edge positioned out of the duct of the fuselage and axially forward of the leading edge of the fuselage, wherein at least a portion of the canard wing comprises a control surface having a variable angle of attack. The invention provides an aerial vehicle that can take-off and land vertically, hover for extended periods of time over a fixed spatial point, and operate in confined areas. The aerial vehicle also has the ability to transition between a hover and high speed forward flight.

53 Claims, 12 Drawing Sheets

VERTICAL TAKEOFF AND LANDING AERIAL VEHICLE

RELATED APPLICATION

The present application claims priority to commonly-owned, co-pending provisional U.S. patent application Serial No. 60/303,369 filed Jul. 6, 2001, which is incorporated herein by reference.

TECHNICAL FIELD

The present invention relates to aerial vehicles. In particular, the present invention relates to a vertical takeoff and landing (VTOL) unmanned aerial vehicle having a pair of counter-rotating, variable-pitch propeller blades for providing reversible thrust to allow for distinct hovering and forward flight modes of operation, a toroidal duct that acts as a lifting surface in forward flight mode, and canard wings positioned in front of a leading edge of the duct.

BACKGROUND OF THE INVENTION

There has been a recent increased emphasis on the use of unmanned aerial vehicles (UAVs) for performing, various activities in both civilian and military situations where the use of manned flight vehicles is not appropriate and/or feasible. Such missions include surveillance, reconnaissance, target acquisition and/or designation, data acquisition, communications relay, decoy, jamming, harassment, ordnance delivery, or supply flights. This increased emphasis on the role of UAVs in today's (and tomorrow's) society has led to many advancements in both airframe design and propulsion systems for UAVs.

There are generally three types of UAV configurations: a fixed-wing type configuration (a fuselage with wings and horizontally mounted engines for translational flight), helicopter type configuration (a fuselage with a rotor mounted above which provides lift and thrust), and ducted type configuration (a fuselage with a ducted rotor system which provides translational flight, as well as vertical take-off and landing capabilities). A wing-type UAV provides several benefits over a helicopter or ducted type UAV. First, and foremost, is the ability of a winged UAV to travel at considerably greater speeds and for longer distances than a conventional helicopter or ducted type UAV. Also, a winged UAV can typically carry a larger mission payload and/or fuel supply than a helicopter or ducted type UAV. As such, fixed-wing UAVs are generally better suited than helicopter or ducted type UAVs for certain mission profiles involving endurance, distance, higher speed and load capability.

Winged UAVs, however, generally have deficiencies that limit their utility for unmanned tactical reconnaissance. For example, winged UAVs require forward motion to maintain lift and, therefore, are not capable of hovering over a fixed spatial point, which may be desirable in some situations. Also, winged UAVs cannot take-off and land vertically, but may require elaborate launch and retrieval equipment.

Helicopter UAVs can hover over a fixed spatial point and takeoff and land vertically but have limitations when operating in confined areas due to the exposed rotors rotating above the fuselage. Also, helicopter UAVs tend to have a high center-of-gravity (CG) and therefore have limited ability when landing on sloped surfaces or pitching ship decks. A high CG aircraft tends to roll over when landing on steep slopes.

The ability of a ducted rotor-type UAVs to take-off and land vertically, hover for extended periods of time over a fixed spatial point, operate in confined areas, and land on sloped surfaces if desired, makes a ducted rotor-type UAV ideally suited for real time tactical reconnaissance, target acquisition, surveillance, and ordnance delivery missions for front line tactical units. However, many ducted rotor-type UAVs do not have the ability to transition to high speed forward flight.

What is still desired is an improved unmanned aerial vehicle that can take-off and land vertically, hover for extended periods of time over a fixed spatial point, operate in confined areas, and land on sloped surfaces if desired. Preferably, the improved vehicle will also have the ability to transition between a hover and high speed forward flight.

SUMMARY OF THE INVENTION

The present invention generally provides an aerial vehicle including a toroidal fuselage having a longitudinal axis, and a duct extending along the longitudinal axis between a leading edge and a trailing edge of the fuselage, first and second counter-rotating, variable pitch rotor assemblies coaxially mounted within the duct of the fuselage, and at least one canard wing secured to the toroidal fuselage and having a leading edge positioned out of the duct of the fuselage and axially forward of the leading edge of the fuselage, wherein at least a portion of the canard wing comprises a control surface having a variable angle of attack.

The aerial vehicle can take-off and land vertically, hover for extended periods of time over a fixed spatial point, operate in confined areas, and land on sloped surfaces if desired. The aerial vehicle of the present invention also has the ability to transition between a hover and high speed forward flight.

The present invention also provides an aerial vehicle including a toroidal fuselage having a longitudinal axis, and a duct extending along the longitudinal axis, a hollow propeller shaft coaxially extending along the axis and within the duct, and first and second rotor assemblies coaxially mounted on the propeller shaft within the duct. Each rotor assembly includes a hub mounted on the propeller shaft for rotation about the axis, and at least two propeller blades extending radially outwardly from the hub. Each propeller blade includes an axis extending substantially normal with respect to the axis of the duct, and the propeller blades are rotatably about the blade axes.

Each rotor assembly also includes a coupling assembly received on the propeller shaft and movable with respect to the propeller shaft parallel with the axis of the fuselage, and linkages pivotally connected between the coupling assembly and the propeller blades so that movement of the coupling assembly on the propeller shaft causes rotation of the propeller blades about the propeller axes. A rod is received within the hollow propeller shaft, and is movable with respect to the propeller shaft parallel with the axis of the duct. The rod is connected to the coupling assemblies so that movement of the rod within the propeller shaft causes movement of the coupling assembly on the propeller shaft.

The foregoing and other features and advantages of the present invention will become more apparent in light of the following detailed description of the preferred embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show an exemplary embodiment of the invention. However, it should be understood that this invention is not limited to the precise arrangements and instrumentalities of the exemplary embodiment shown in the drawings.

Like reference characters identify corresponding or similar elements throughout the several views.

DETAILED DESCRIPTION OF EXEMPLARY EMBODIMENTS OF THE INVENTION

Figure 1:
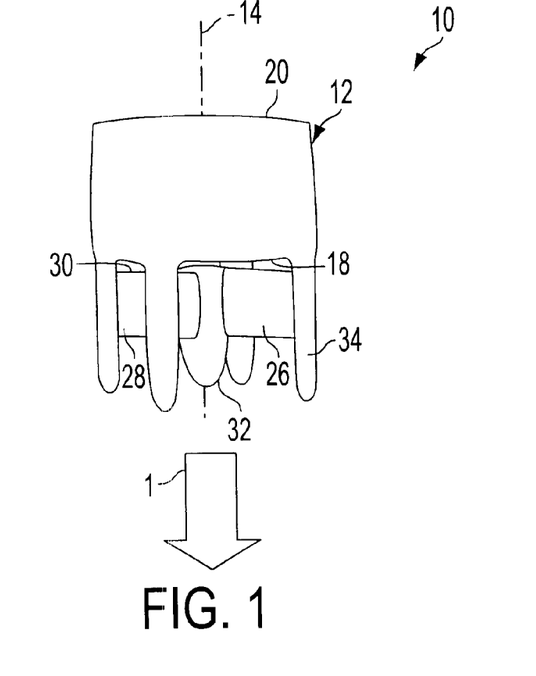
FIG. 1 is a side perspective view of an exemplary embodiment of a vertical takeoff and landing (VTOL) unmanned aerial vehicle, shown during hover.
Figure 2:
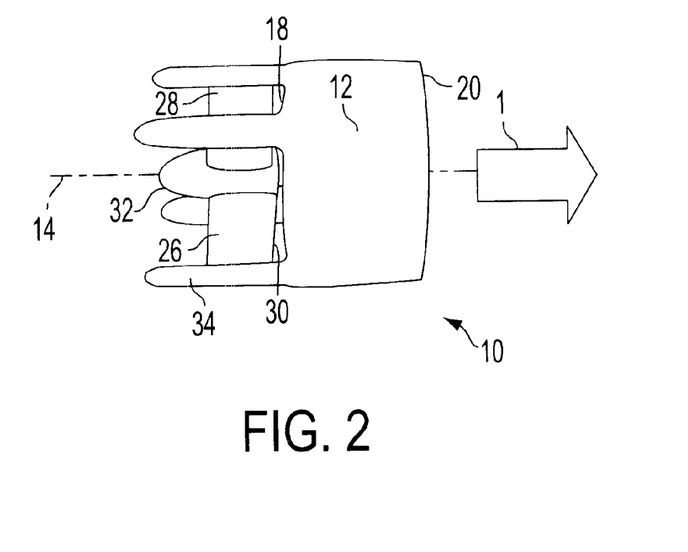
FIG. 2 is a side perspective view of the vehicle of FIG. 1, shown during forward translational flight.

Referring first to FIGS. 1 through 6 of the drawings, the present invention generally provides an aerial vehicle 10 including a toroidal fuselage 12 having a longitudinal axis 14, and a duct 16 extending along the longitudinal axis 14 between a leading edge 18 and a trailing edge 20 of the fuselage 12, and first and second counter-rotating, variable pitch rotor assemblies 22, 24 coaxially mounted within the duct 16 of the fuselage 12. The pitch of the rotor assemblies 22, 24 can be adjusted to reverse thrust and reverse the direction of flight of the vehicle 10, so that the vehicle 10 can transition between a hover, as shown in FIG. 1, and relatively high speed forward flight, as shown in FIG. 2 (arrow "1" in FIGS. 1 and 2 illustrate the direction of thrust produced by the rotor assemblies 22, 24). The vehicle 10 also includes at least one canard wing 26 secured to the toroidal fuselage 12 and having a leading edge 28 positioned out of the duct 16 of the fuselage 12 and axially forward of the leading edge 18 of the fuselage 12, wherein at least a portion of the canard wing 26 comprises a control surface having a variable angle of attack.

In an exemplary embodiment, the vehicle 10 has a maximum linear dimension of only about ten inches (10") and is designed to be carried by a single person, such as a soldier. The vehicle 10 is also designed to be remotely flown, through radio signals for example, and can be used, for example, for conducting aerial surveillance.

The vehicle 10 is also provided with a central pod 32 extending beyond the leading edge 18 of the fuselage 12 coaxially along the longitudinal axis 14, and outer pods 34 extending from the leading edge 18 of the fuselage 12 parallel with the longitudinal axis 14. The pods 32, 34 help distribute the weight of the vehicle 10 so that a center of gravity of the vehicle 10 is positioned forward of the rotor assemblies 22, 24 during forward flight to help provide stability during forward flight. The pods 32, 34 also help distribute the weight of the vehicle 10 so that the center of gravity of the vehicle 10 is positioned relatively low when the vehicle 10 is landed on the ground, so that the vehicle 10 is less likely to tip over upon landing.

Figure 13:
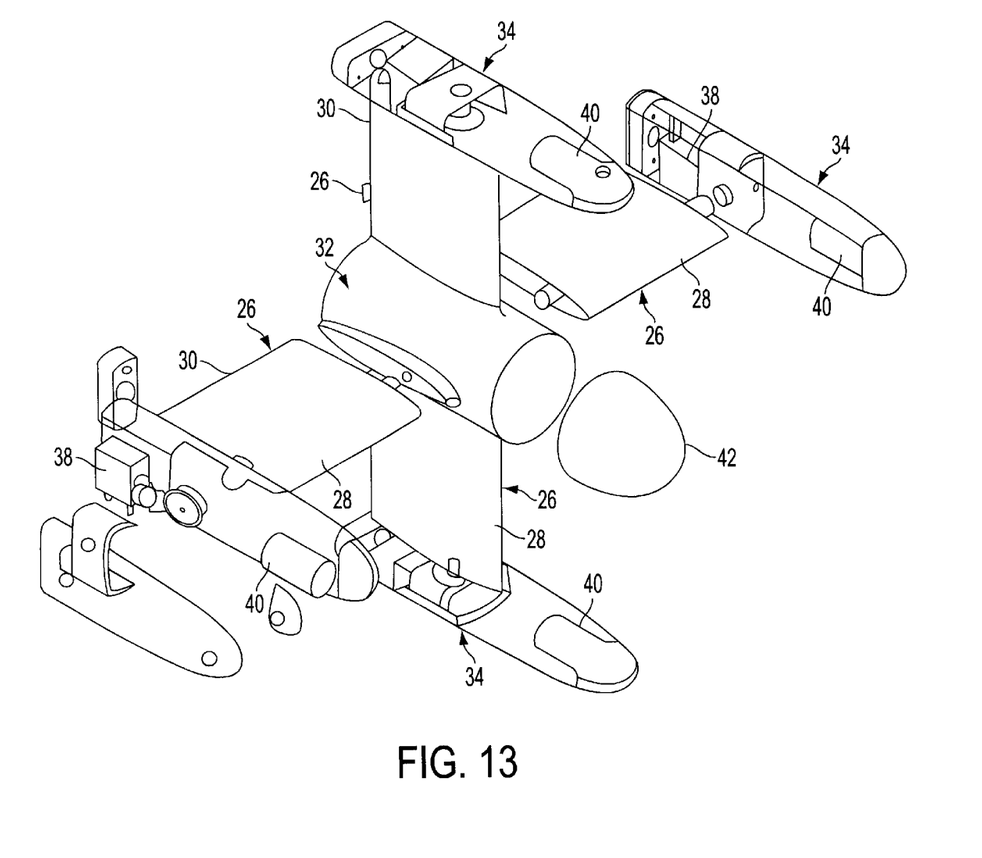
FIG. 13 is an exploded perspective view of an exemplary embodiment of a fore body assembly of the vehicle of FIG. 1, including an avionics body, pod assemblies, and canard wings.

In the exemplary embodiment shown, the at least one canard wing comprises four canard wings 26 radially extending with respect to the longitudinal axis 14 from the central pod 32 to the outer pods 34. As also shown in FIG. 13, the canard wings 26 each also include a trailing edge 30 positioned out of the duct 16 of the fuselage 12 and axially forward of the leading edge 18 of the fuselage 12. In the exemplary embodiment shown, each of the canard wings 26 are fully pivotal so that each canard wing acts entirely as a control surface. Alternatively, the canard wings 26 can be fixed and provided with movable control surfaces, such as flaps. Each canard wing 26 is mounted on rotatable wing rods 36 that extend between the central pod 32 and the outer pods 34. An actuator 38 is operatively connected to each of the wing rods 36 for varying the angle of attack of (i.e., rotating) the canard wings 26. The actuators are preferably electrical servos 38 that are controlled by signals from an onboard computer that regulates the amount that the actuators 38 rotate the wing rods 36. Since there are four actuators 38, one for controlling each wing 26, the wings 26 can be independently pivoted.

The outer pods 34 contain the actuators 38 of the canard wings 26. The outer pods 34 also contain fuel cells, such as replaceable batteries 40 for example. Distal ends of the outer pods 34 act as landing gear and support the vehicle 10 on the ground. The outer pods 34 are sized with respect to the central pod 32 such that a distal end of the central pod 32 is support above the ground when the distal ends of the outer pods 34 support the vehicle 10 on the ground. The central pod 32 contains an avionics bay for containing flight control equipment (not shown) such as data transmitters and receivers, and a payload bay for containing sensors (not shown), such as a forward looking infrared radar (FLIR) sensor. The payload bay is accessible through a removable nose cone 42. The central pod 32 also contains an actuator (not shown) operatively connected to the rotor assemblies 22, 24 for varying the pitch of the rotor assemblies 22, 24, as describe below.

Figure 3:
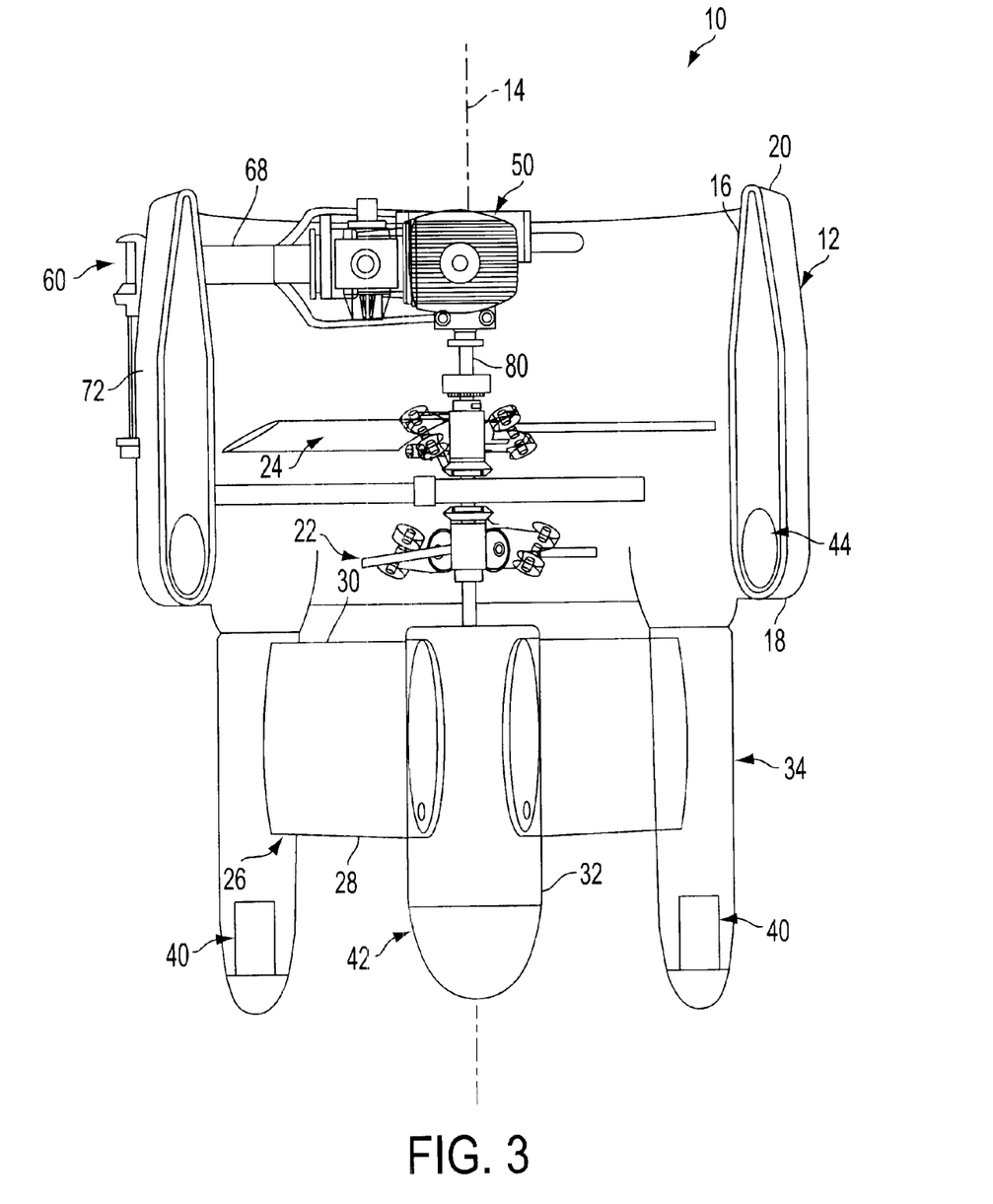
FIG. 3 is an enlarged side perspective view, partially cut-away, of the vehicle of FIG. 1, many of the internal components of the vehicle.
Figure 4:
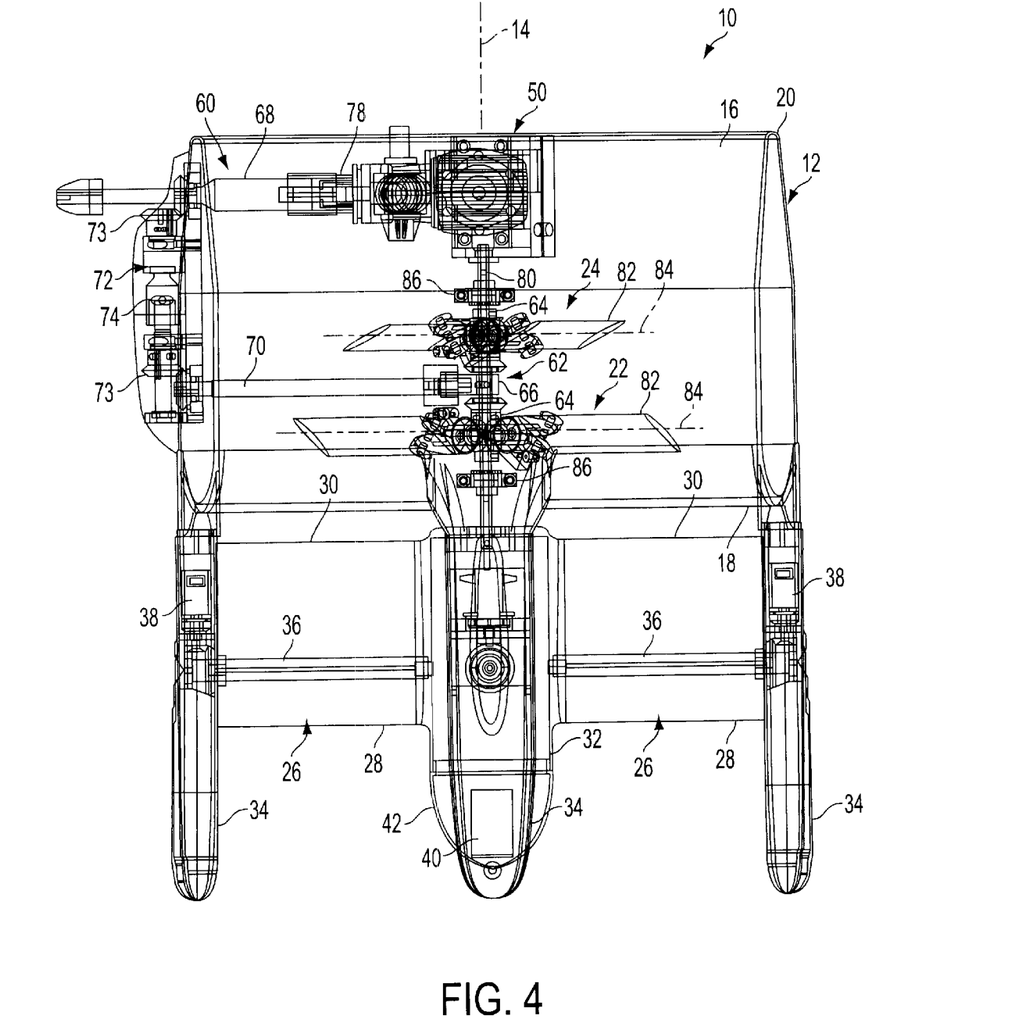
FIG. 4 is a schematic representation of a side elevation view of the vehicle of FIG. 1, illustrating many of the internal components of the vehicle.
Figure 5:
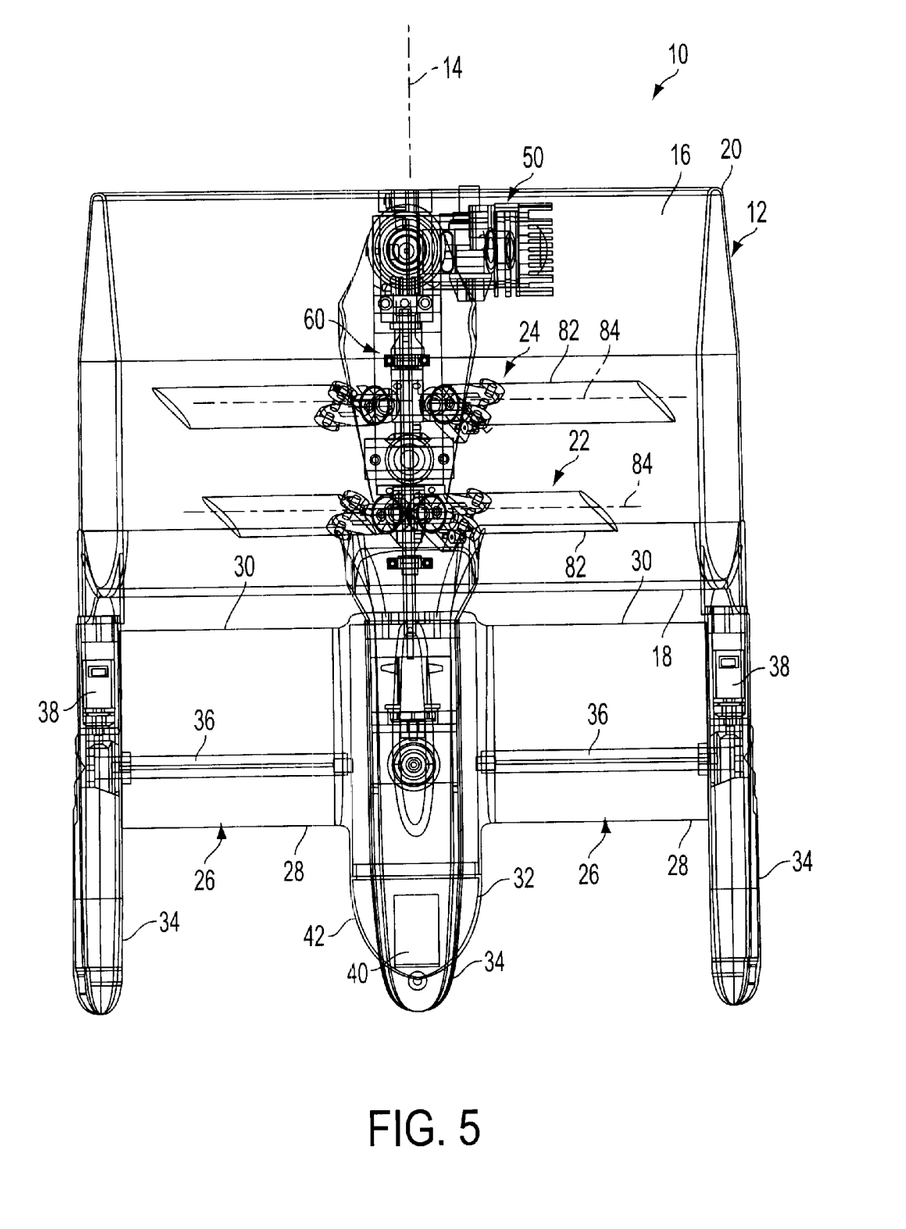
FIG. 5 is a schematic representation of a side elevation view of the vehicle of FIG. 1, rotated 90° in a counter-clockwise direction with respect to FIG. 4.
Figure 6:
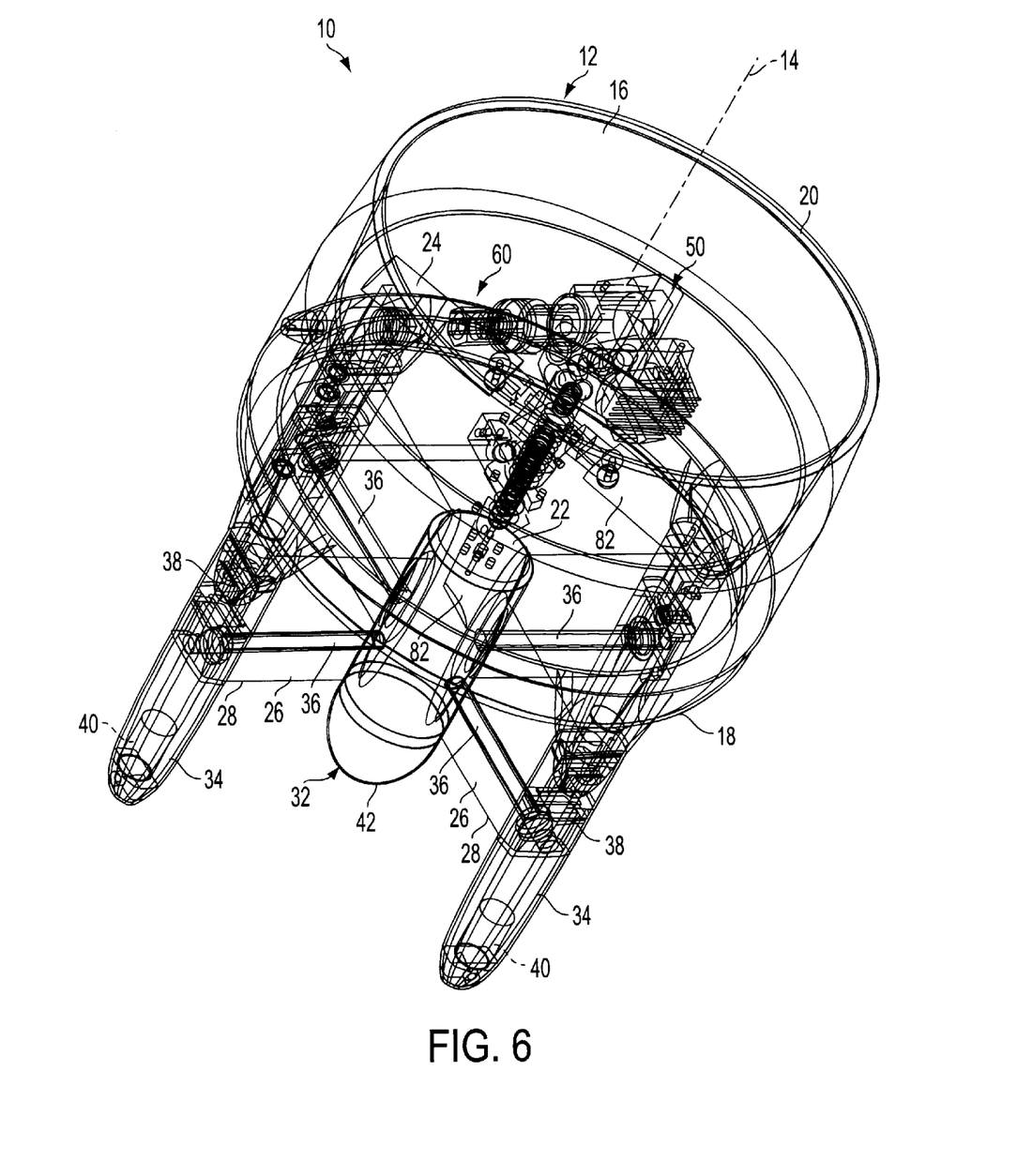
FIG. 6 is a schematic representation of a top perspective view of the vehicle of FIG. 1.
Figure 7:
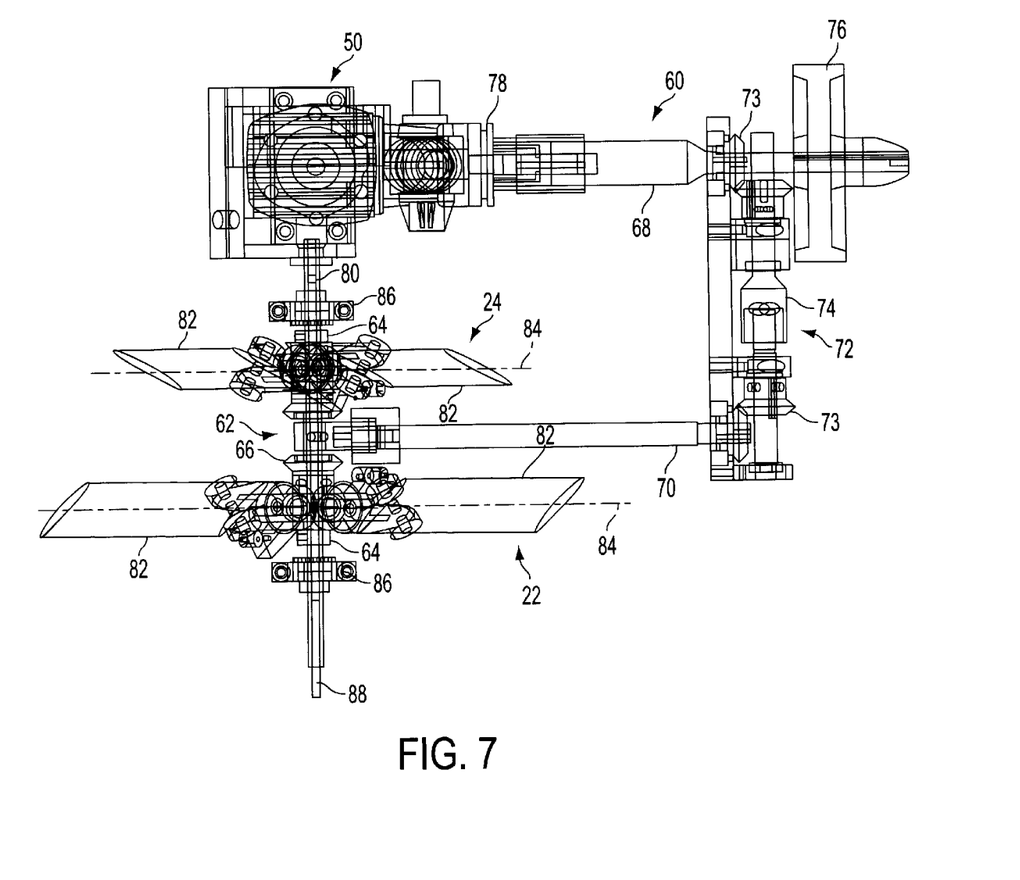
FIG. 7 is a schematic representation of a side elevation view of exemplary embodiments of an engine, counter-rotating, variable pitch propeller blades, and a drive train operatively connecting the engine to the propeller blades, of the vehicle of FIG. 1.
Figure 8:
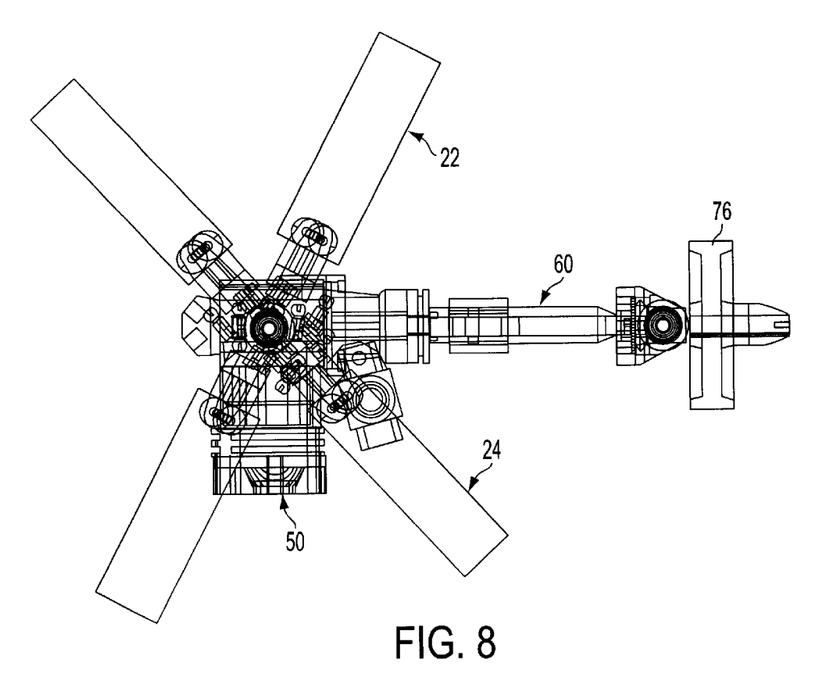
FIG. 8 is a schematic representation of a top plan view of the engine, the propeller blades and the drive train of the vehicle of FIG. 1.
Figure 9:
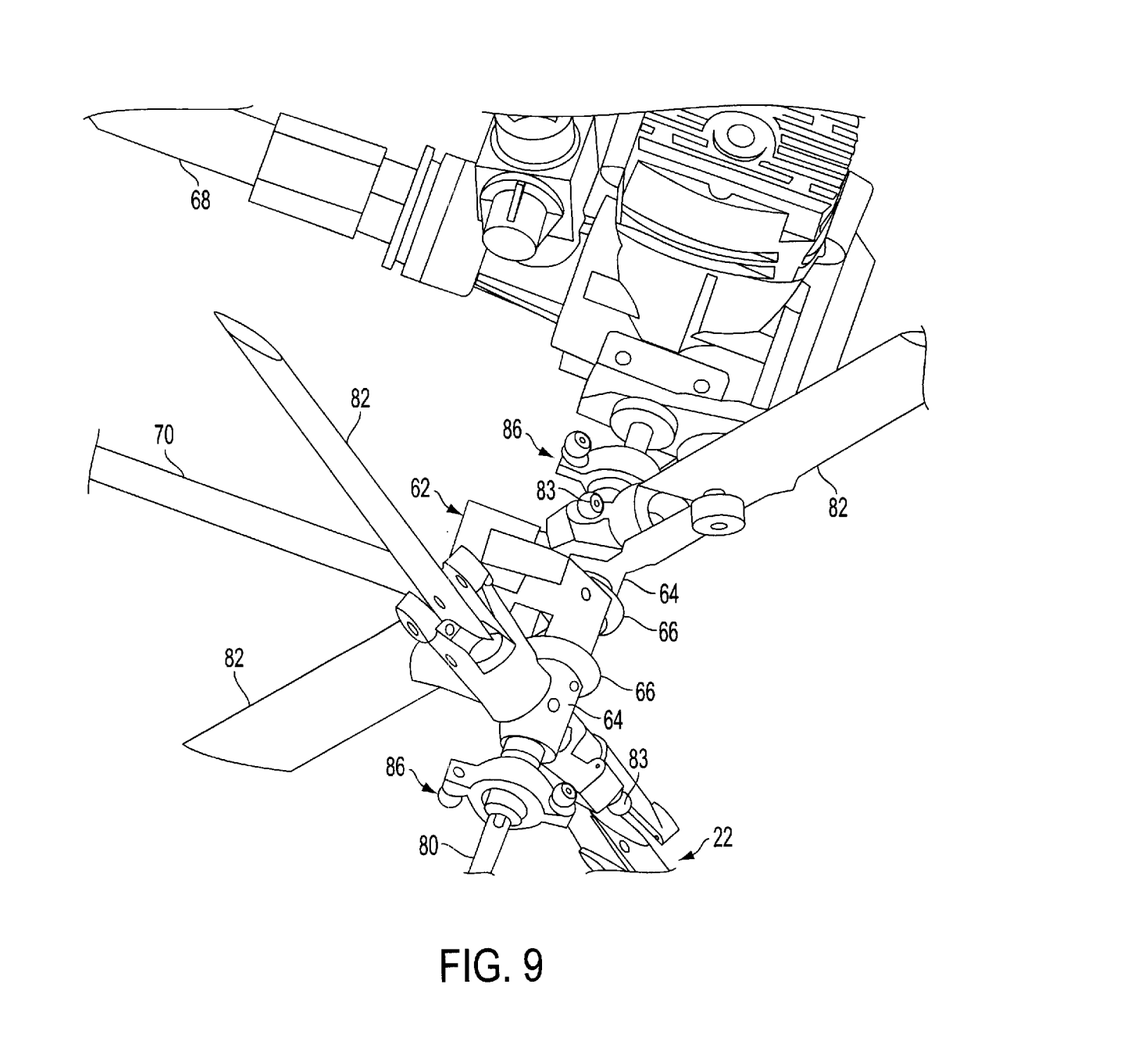
FIG. 9 is a bottom perspective view of portions of the engine, the propeller blades and the drive train of the vehicle of FIG. 1.
Figure 10:
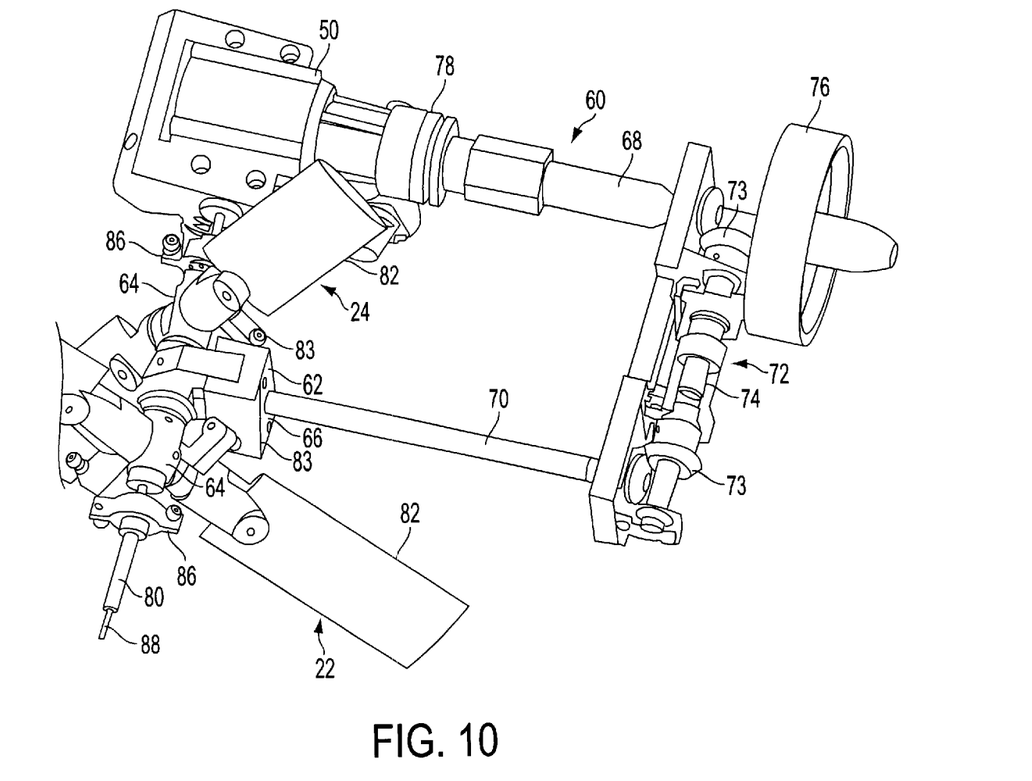
FIG. 10 is a bottom perspective view of portions of the engine, the propeller blades and the drive train of the vehicle of FIG. 1, shown from an opposite side with respect to FIG. 9.

As shown in FIGS. 4 through 10, the vehicle 10 also includes an engine 50 and a drive train 60 operatively connecting the engine 50 to the first and the second rotor assemblies 22, 24. In one exemplary embodiment, the engine 50 is a 0.25 cubic inch displacement 2-stroke glow fuel engine. As shown in FIG. 3, the fuselage 12 includes an internal toroidal fuel bladder 44 which is preferably positioned against an internal surface of the leading edge 18 of the fuselage 12. The fuel bladder 44 is for containing gasoline or other liquid fuel for the engine 50. Positioning the fuel bladder 44 against the leading edge 18 of the fuselage 12 helps maintain the center of gravity of the vehicle 10 forward of the rotor assemblies 22, 24.

Referring to FIGS. 4 through 10, the drive train 60 includes a gearbox 62 located between the rotor assemblies 22, 24, a primary drive shaft 68, a secondary drive shaft 70, and a connecting drive shaft 72. The drive shafts 68, 70, 72 are operatively connected between the engine 50 and the gearbox 62, and the rotor assemblies 22, 24 include rotatable propeller hubs 64 operatively connected between the gearbox 62 and propeller blades 82 of the rotor assemblies 22, 24. The drive shafts 68, 70, 72 and the propeller hubs 64 are operatively connected to the gearbox through bevel gears 66. The bevel gears operatively connecting the gear box 62 preferably comprise straight bevel gears 66.

The primary and secondary drive shafts 68, 70 are substantially parallel and connected by the connecting drive shaft 72, wherein the primary drive shaft 68 extends between the engine 50 and the connecting drive shaft 72 and the secondary drive shaft 70 extends between the connecting drive shaft 72 and the gear box 62. The drive shafts 68, 70, 72 are operatively connected through bevel gears 73. The bevel gears operatively connecting the drive shafts 68, 70, 72 preferably comprise straight bevel gears 73. Moreover, the bevel gears 73 operatively connecting the drive shafts 68, 70, 72 are adapted to comprise a gear reduction train between the engine 50 and the rotor assemblies 22, 24.

The drive train 60 can also include a clutch, such as a one-way Sprague clutch 74, and a flywheel 76 connected to an end of the primary drive shaft 68. Moreover, a flex coupling 78 can be used to attach the primary drive shaft 68 to the engine 50 to permit angular misalignment while transmitting torque.

Referring to FIGS. 3 through 10, the rotor assemblies 22, 24 are received on a single propeller shaft 80 coaxially positioned with the axis 14 of the fuselage 12, and each includes the hub 64 mounted on the propeller shaft 80 for rotation about an axis of the propeller shaft 80 (i.e., the axis 14 of the fuselage 12), and at least two propeller blades 82 extending radially outwardly from the hub 64. Each propeller blade 82 includes an axis 84 extending substantially normal with respect to the axis 14 of the fuselage 12, and the propeller blades 82 are rotatably with respect to the propeller hub 64 about the propeller blade axes 84 (so that the pitch of the blades 82 can be varied).

Each rotor assembly 22, 24 also includes a coupling assembly 86 received on the propeller shaft 80 and movable with respect to the propeller shaft 80 parallel with the axis 14 of the fuselage 12, and linkages (not shown) pivotally connected between the coupling assembly 86 and the propeller blades 82. A linearly movable actuation rod 88 is connected to the coupling assemblies 86 and a linear actuator (not shown) is positioned in the central pod 32 and connected to the actuation rod 88. Upon the linear actuator being actuated, the actuation rod 88 causes linear movement of the coupling assemblies 86 on the propeller shaft 80 and along the axis 14 of the fuselage 12. Linear movement of the coupling assemblies 86, in-turn, causes rotation of the propeller blades 82 such that the pitch of the rotor assemblies 22, 24 changes as desired. The actuator is preferably an electrical servos that is controlled by signals from an onboard computer that regulates the amount that the actuator rotates the propeller blades 82. In the exemplary embodiment shown, the propeller shaft 80 is hollow and the rod 88 is movably received within the propeller shaft 80 for linear movement along the axis 14 of the fuselage 12.

Figure 11:
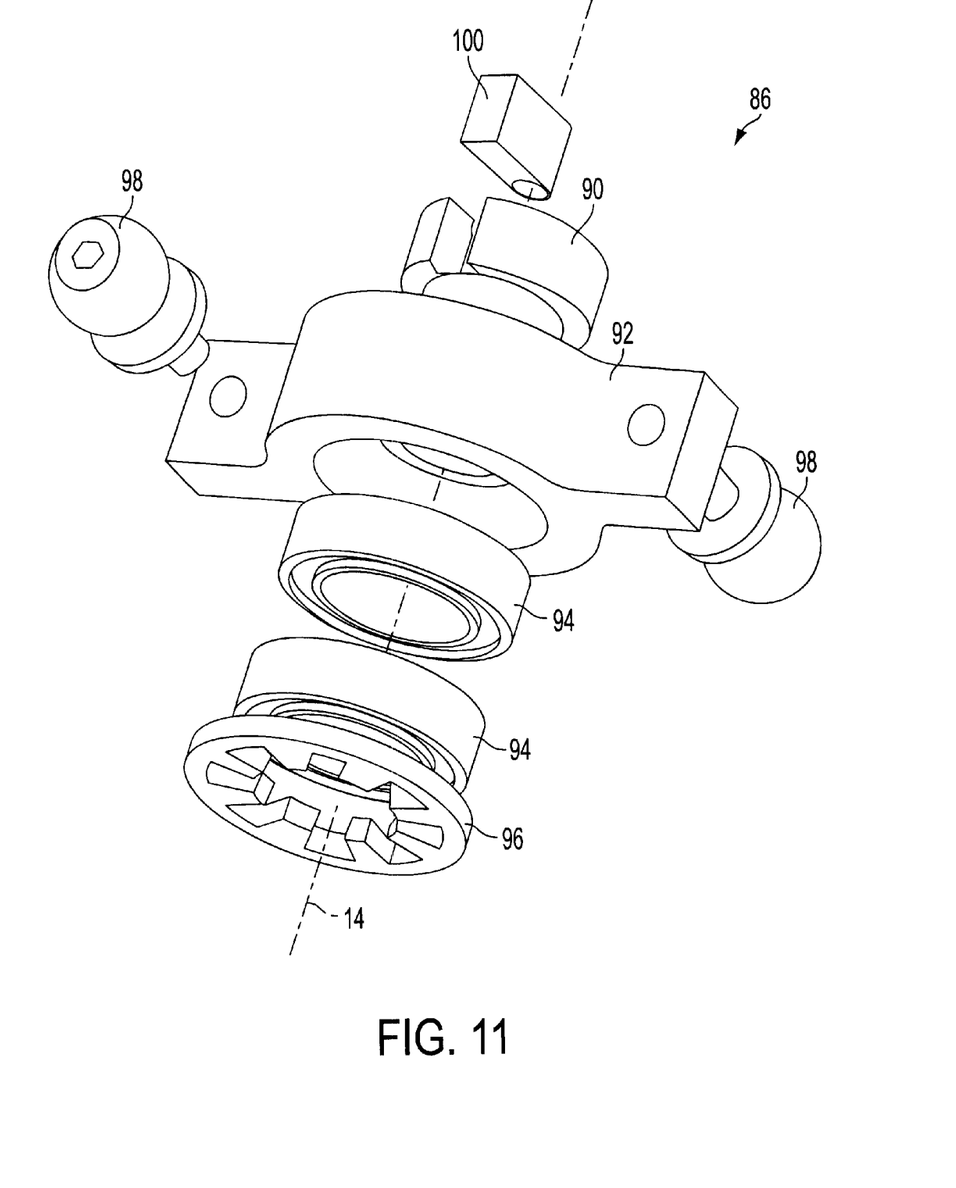
FIG. 11 is a bottom exploded perspective view of one of two exemplary embodiments of variable pitch coupling assemblies of the drive train that operatively connect variable pitch control actuators (not shown) to the variable pitch propeller blades of the vehicle of FIG. 1.
Figure 12:
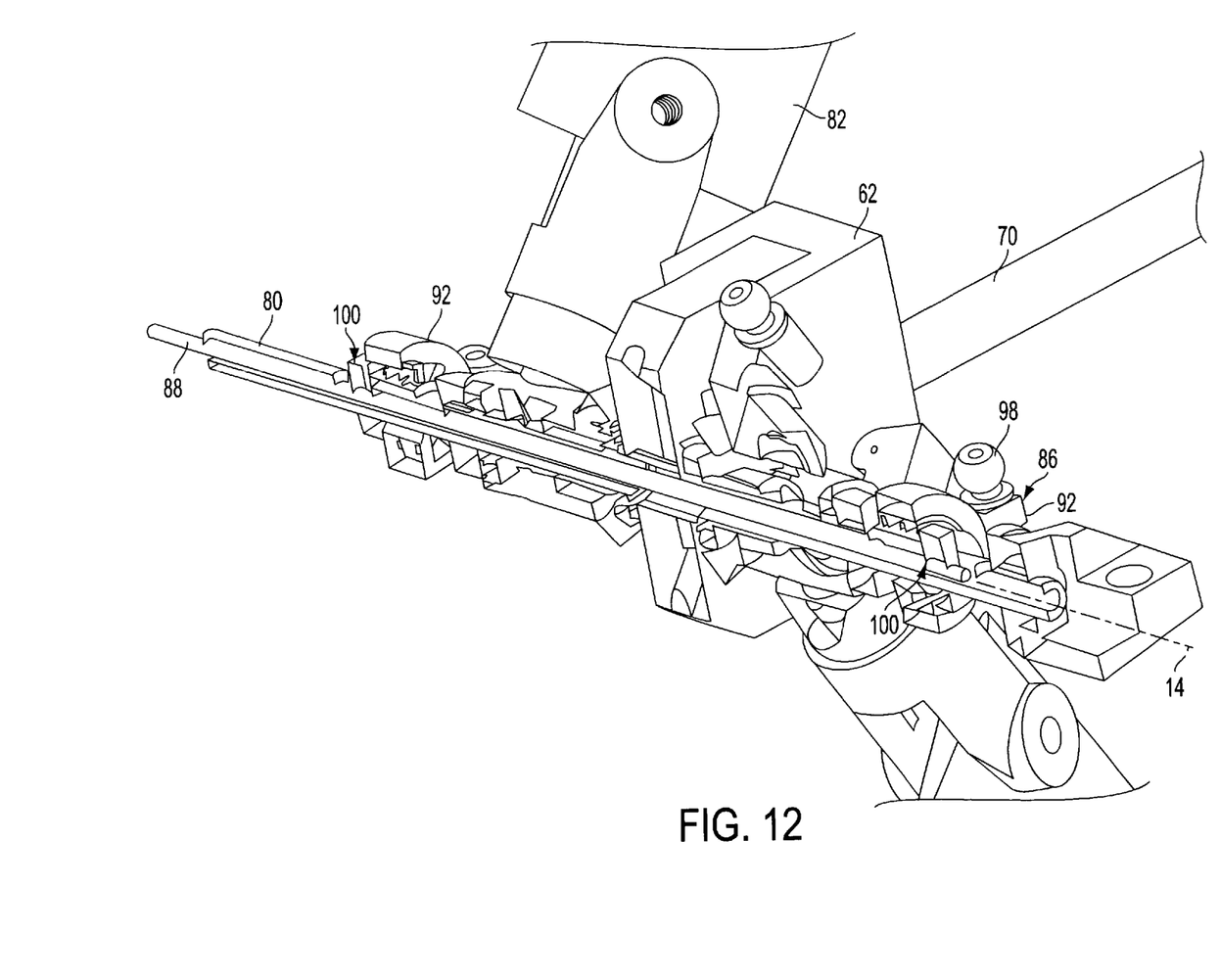
FIG. 12 is a bottom perspective view, partially cut-away, of portions of the propeller blades and the drive train of the vehicle of FIG. 1.

Referring to FIGS. 11 and 12, each of the coupling assemblies 86 includes a carrier 90 slidably received on the propeller shaft 80 for linear movement along the axis 14 of the fuselage 12, and an actuator arm 92 mounted on the carrier 90 for rotation (with the propeller hubs 64 and blades 82) on bearings 94 about the axis 14 of the fuselage 12. A star retainer 96 holds the actuator arm 92 and the bearings 94 on the carrier 90. The actuator arms 92 have ball links 98 for pivotally receiving a linkage (not shown) also pivotally connected to ball links 83 of the propeller blades 82. Each assembly 86 also includes a tie 100 connecting the carrier 90 to the rod 88 movably received within the propeller shaft 80 (the tie 100 extends through a longitudinal slot in the hollow propeller shaft 80).

The present invention, therefore, generally provides an aerial vehicle 10 including a toroidal fuselage 12 having a longitudinal axis 14, and a duct 16 extending along the longitudinal axis 14 between a leading edge 18 and a trailing edge 20 of the fuselage, first and second counter-rotating, variable pitch rotor assemblies 22, 24 coaxially mounted within the duct of the fuselage, and at least one canard wing 26 secured to the toroidal fuselage and having a leading edge 28 positioned out of the duct of the fuselage and axially forward of the leading edge of the fuselage. The aerial vehicle 10 can take-off and land vertically, hover for extended periods of time over a fixed spatial point, operate in confined areas, and land on sloped surfaces if desired. The aerial vehicle 10 of the present invention also has the ability to transition between a hover and high speed forward flight.

The present invention also provides an aerial vehicle 10 including a toroidal fuselage 12 having a longitudinal axis 14, and a duct 16 extending along the longitudinal axis, a hollow propeller shaft 80 coaxially extending along the axis 14 and within the duct, and first and second rotor assemblies 22, 24 coaxially mounted on the propeller shaft within the duct. Each rotor assembly 22, 24 includes a hub 64 mounted on the propeller shaft 80 for rotation about the axis 14, and at least two propeller blades 82 extending radially outwardly from the hub 64. Each propeller blade 82 includes an axis 84 extending substantially normal with respect to the axis 14 of the duct, and the propeller blades 82 are rotatably about the blade axes 84.

Each rotor assembly 22, 24 also includes a coupling assembly 86 received on the propeller shaft 80 and movable with respect to the propeller shaft parallel with the axis 14 of the fuselage 12, and linkages pivotally connected between the coupling assembly 86 and the propeller blades 82 so that movement of the coupling assembly 86 on the propeller shaft 80 causes rotation of the propeller blades 82 about the propeller axes 82 to change the pitch of the rotor assemblies. A rod 88 is received within the hollow propeller shaft 80, and is movable with respect to the propeller shaft parallel with the axis 14 of the duct. The rod 88 is connected to the coupling assemblies 86 so that movement of the rod within the propeller shaft causes movement of the coupling assemblies 86 on the propeller shaft 80 and rotation of the propeller blades 82.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. An aerial vehicle comprising:
    a toroidal fuselage having a longitudinal axis, and a duct extending along the longitudinal axis between a leading edge and a trailing edge of the fuselage;
    first and second counter-rotating, variable pitch rotor assemblies coaxially mounted within the duct of the fuselage; and
    at least one canard wing secured to the toroidal fuselage and having a leading edge positioned out of the duct of the fuselage and axially forward of the leading edge of the fuselage, wherein at least a portion of the at least one canard wing comprises a control surface having a variable angle of attack, wherein the at least one canard wing includes a trailing edge positioned out of the duct of the fuselage and axially forward of the leading edge of the fuselage.

2. An aerial vehicle according to claim 1, wherein the entire at least one canard wing comprises a control surface.

3. An aerial vehicle according to claim 1, further comprising an actuator operatively connected to the at least one movable canard wing for varying the angle of attack.

4. An aerial vehicle according to claim 1, wherein the at least one canard wing comprises four canard wings radially extending from the longitudinal axis of the fuselage.

5. An aerial vehicle according to claim 1, further comprising a central pod extending beyond the leading edge of the fuselage coaxially along the longitudinal axis and outer pods extending from the leading edge of the fuselage parallel with the longitudinal axis, and wherein the at least one canard wing comprises four canard wings radially extending with respect to the longitudinal axis from the central pod to the outer pods.

6. An aerial vehicle according to claim 5, wherein the outer pods contain fuel cells.

7. An aerial vehicle according to claim 6, wherein the fuel cells comprise batteries.

8. An aerial vehicle according to claim 5, wherein the outer pods contain actuators operatively connected to the movable canard wing for varying the angles of attack of the wings.

9. An aerial vehicle according to claim 5, wherein distal ends of the outer pods comprise landing gear.

10. An aerial vehicle according to claim 5, wherein the central pod contains an avionics bay.

11. An aerial vehicle according to claim 5, wherein the central pod contains a payload bay.

12. An aerial vehicle according to claim 5, wherein the central pod contains an actuator operatively connected to the rotor assemblies for varying the pitch of the rotor assemblies.

13. An aerial vehicle according to claim 1, wherein the fuselage includes an internal toroidal fuel bladder positioned against the leading edge of the fuselage.

14. An aerial vehicle according to claim 1, further comprising at least one engine mounted within the fuselage, and a drive train operatively connecting the engine to the first and the second rotor assemblies.

15. An aerial vehicle according to claim 14, wherein the drive train includes a gearbox located between the rotor assemblies, a rotatable drive shaft operatively connected between the engine and the gearbox, and the rotor assemblies include rotatable propeller hubs operatively connected between the gearbox and propeller blades of the rotor assemblies.

16. An aerial vehicle according to claim 15, wherein the drive shaft and the propeller hubs are operatively connected to the gearbox through bevel gears.

17. An aerial vehicle according to claim 16, wherein the bevel gears operatively connecting the gear box comprise straight bevel gears.

18. An aerial vehicle according to claim 15, wherein the drive shaft includes substantially parallel primary and secondary drive shafts connected by a connecting drive shaft, wherein the primary drive shaft extends between the engine and the connecting drive shaft and the secondary drive shaft extends between the connecting drive shaft and the gear box.

19. An aerial vehicle according to claim 18, wherein the drive shafts are operatively connected through bevel gears.

20. An aerial vehicle according to claim 19, wherein the bevel gears operatively connecting the drive shafts comprise straight bevel gears.

21. An aerial vehicle according to claim 19, wherein the bevel gears operatively connecting the drive shafts comprise a gear reduction train.

22. An aerial vehicle according to claim 14, wherein the drive train includes a clutch.

23. An aerial vehicle according to claim 22, wherein the clutch comprises a Sprague clutch.

24. An aerial vehicle according to claim 14, wherein the drive train includes a flywheel.

25. An aerial vehicle according to claim 1, wherein the rotor assemblies are received on a single propeller shaft and each comprises:
    a hub mounted on the propeller shaft for rotation about an axis of the propeller shaft; and
    at least two propeller blades extending radially outwardly from the hub.

26. An aerial vehicle according to claim 25, wherein each propeller includes an axis extending substantially normal with respect to the axis of the propeller shaft, and the propeller blades are rotatable with respect to the propeller hub about the propeller axes.

27. An aerial vehicle according to claim 26, wherein each rotor assembly further comprises a coupling assembly received on the propeller shaft and movable with respect to the propeller shaft parallel with the axis of the propeller shaft, and linkages pivotally connected between the coupling assembly and the propeller blades.

28. An aerial vehicle according to claim 27, further comprising a movable rod connected to the coupling assemblies and a linear actuator connected to the actuation rod.

29. An aerial vehicle according to claim 28, wherein the propeller shaft is hollow and the rod is movably received within the propeller shaft.

30. An aerial vehicle comprising:
    a toroidal fuselage having a longitudinal axis, and a duct extending along the longitudinal axis;
    a hollow propeller shaft coaxially extending along the axis and within the duct;
    first and second rotor assemblies coaxially mounted on the propeller shaft within the duct, wherein each rotor assembly includes,
        a hub mounted on the propeller shaft for rotation about the axis,
        at least two propeller blades extending radially outwardly from the hub, wherein each propeller includes an axis extending substantially normal with respect to the axis of the duct, and the propeller blades are rotatably about the propeller axes,
        a coupling assembly received on the propeller shaft and movable with respect to the propeller shaft parallel with the axis of the fuselage, linkages pivotally connected between the coupling assembly and the propeller blades so that movement of the coupling assembly on the propeller shaft causes rotation of the propeller blades about the propeller axes, and a rod received within the hollow propeller shaft, movable with respect to the propeller shaft parallel with the axis of the duct, and connected to the coupling assemblies so that movement of the rod within the propeller shaft causes movement of the coupling assembly on the propeller shaft.

31. An aerial vehicle according to claim 30, further comprising a linear actuator connected to the rod.

32. An aerial vehicle according to claim 30, further comprising at least one engine mounted within the fuselage, and a drive train operatively connecting the engine to the first and the second rotor assemblies.

33. An aerial vehicle according to claim 32, wherein the drive train includes a gearbox located between the rotor assemblies, a rotatable drive shaft operatively connected between the engine and the gearbox, and the rotatable propeller hubs are operatively connected to the gearbox.

34. An aerial vehicle according to claim 33, wherein the drive shaft and the propeller hubs are operatively connected to the gearbox through bevel gears.

35. An aerial vehicle according to claim 34, wherein the bevel gears operatively connecting the gear box comprise straight bevel gears.

36. An aerial vehicle according to claim 33, wherein the drive shaft includes substantially parallel primary and secondary drive shafts connected by a connecting drive shaft, wherein the primary drive shaft extends between the engine and the connecting drive shaft and the secondary drive shaft extends between the connecting drive shaft and the gear box.

37. An aerial vehicle according to claim 36, wherein the drive shafts are operatively connected through bevel gears.

38. An aerial vehicle according to claim 37, wherein the bevel gears operatively connecting the drive shafts comprise straight bevel gears.

39. An aerial vehicle according to claim 37, wherein the bevel gears operatively connecting the drive shafts comprise a gear reduction train.

40. An aerial vehicle according to claim 32, wherein the drive train includes a clutch.

41. An aerial vehicle according to claim 40, wherein the clutch comprises a Sprague clutch.

42. An aerial vehicle according to claim 32, wherein the drive train includes a flywheel.

43. An aerial vehicle according to claim 30, further comprising at least one canard wing secured to the toroidal fuselage and having a leading edge positioned out of the duct of the fuselage and axially forward of a leading edge of the fuselage.

44. An aerial vehicle according to claim 43, wherein the canard wing includes a trailing edge positioned out of the duct of the fuselage and axially forward of the leading edge of the fuselage.

45. An aerial vehicle according to claim 43, wherein the at least one canard wing comprises four canard wings radially extending from the longitudinal axis of the fuselage.

46. An aerial vehicle according to claim 43, further comprising a central pod extending beyond a leading edge of the fuselage coaxially along the longitudinal axis and outer pods extending from the leading edge of the fuselage parallel with the longitudinal axis, and wherein the at least one canard wing comprises four canard wings radially extending with respect to the longitudinal axis from the central pod to the outer pods.

47. An aerial vehicle according to claim 46, wherein the outer pods contain fuel cells.

48. An aerial vehicle according to claim 47, wherein the fuel cells comprise batteries.

49. An aerial vehicle according to claim 46, wherein distal ends of the outer pods comprise landing gear.

50. An aerial vehicle according to claim 46, wherein the central pod contains an avionics bay.

51. An aerial vehicle according to claim 46, wherein the central pod contains a payload bay.

52. An aerial vehicle according to claim 46, wherein the central pod contains an actuator operatively connected to the rod of the rotor assemblies.

53. An aerial vehicle according to claim 30, wherein the fuselage includes an internal toroidal fuel bladder positioned against a leading edge of the fuselage.

* * * * *